E. B. Everitt,
Cage Trap.
No. 104,293.  Patented June 14, 1870.
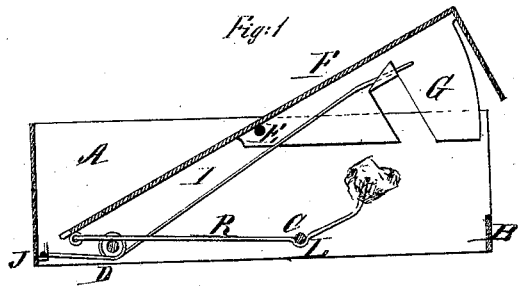
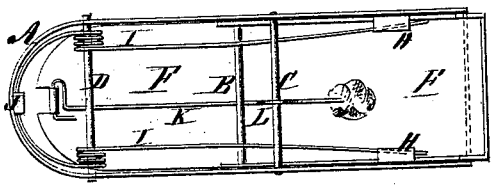
Witnesses:
E. F. Kastenhuber
C. Wahlers
Inventor:
E. B. Everitt

United States Patent Office.

EDWIN BRONSON EVERITT, OF WEST MERIDEN, CONNECTICUT.

Letters Patent No. 104,293, dated June 14, 1870.

IMPROVED ANIMAL-TRAP.

The Schedule referred to in these Letters Patent and making part of the same.

*To all whom it may concern:*

Be it known that I, EDWIN BRONSON EVERITT, of West Meriden, in the county of New Haven and State of Connecticut, have invented a new and useful Improvement in Animal-Traps; and I do hereby declare the following to be a full, clear, and exact description thereof, which will enable those skilled in the art to make and use the same, reference being had to the accompanying drawing forming part of this specification, in which drawing—

Figure 1 is a vertical longitudinal section of my invention.

Figure 2 is an inverted plan view.

Similar letters indicate corresponding parts.

This invention relates to traps for mice, rats, and other vermin, and consists of a box, partly open at one end, and having a movable cover, which is pivoted at about the middle of its length to the sides of the box, the cover being so made at its outer end that when it is down, it closes the open end of the trap.

The inner end of the cover is arranged to swing down into the box when the trap is set, and a rod, whose free ends forms the bait-hook, is hinged to the inner end of the cover.

The cover is operated by a spring, which bears upon lugs formed within the outer end of the cover at its sides, and the cover is locked against the force of the spring by the bait-hook rod, which has a bend or shoulder, that comes beneath a cross-bar of the box when the cover is raised, and holds the trap open.

When an animal enters the open end of the trap and pulls on the bait, the bait-hook rod is drawn downward away from the locking cross-bar and the spring is free to close the cover.

The letter A designates the box of the trap. It is in this example made open at bottom, but it may be closed at bottom, if desired.

The sides of the box are held together and braced by a low cross-bar, B, which is arranged at the bottom of its open end, where I form the entrance of the trap, and by three transverse rods, whereof one, C, constitutes the locking bar for the bait-hook rod, another, D, the support for the actuating spring, and E, the pivot, on which the cover turns.

The rods C and D are arranged near the bottom of the trap.

The left-hand end of the box A is closed, but its right-hand end is open, except so much of it as is closed by the end bar B, and it is only closed when the cover is brought down.

The cover F is pivoted at about the middle of its length at the top of the box on the pivoted rod E, in such a manner that it swings within the sides of the box, and, when the trap is set, the left-hand end of the cover descends toward the bottom of the box.

The right-hand end of the cover is made with a right-angled projection, which, when the cover is down, coincides with the cross-bar B, and closes that end of the box.

The cover F is made with vertical side projections G, which move within the box and guide the cover in its movements, and on these projections G are formed lugs H H, on which the ends of the actuating spring bear to press the cover down.

The spring I is confined at the closed end of the box near its bottom edge, at J, whence it extends in two parts, toward the right to the cross-bar D, around which its parts or branches are coiled, and thence they proceed to the lugs H H, on which their ends are allowed to rest.

The bait-hook is formed at the right-hand end of a rod, K, which is hinged to the under side of the left-hand end of the cover, and, in said rod K, I form a shoulder, L, at such a point that when the trap is set, said shoulder fits around the under side of the locking bar C above mentioned, the bait-hook rod being arranged to pass over the rod D, on which the spring is coiled, and under the locking bar.

My trap can be used for large animals as well as for the smaller kinds.

What I claim as new, and desire to secure by Letters Patent, is—

The box A, constructed as described, in combination with the movable cover F, bait-rod K, and spring I, arranged to operate substantially as described.

EDWIN BRONSON EVERITT.

Witnesses:
COOKE LOUNDSBURY,
ALBERT D. PENNEY.